United States Patent [19]

Hartan et al.

[11] Patent Number: 5,176,797

[45] Date of Patent: Jan. 5, 1993

[54] MANUFACTURING PAPER EMPLOYING A POLYMER OF ACRYLIC OR METHACRYLIC ACID

[75] Inventors: Hans-Georg Hartan, Kevelaer; Alfons Landscheidt, Krefeld, both of Fed. Rep. of Germany

[73] Assignee: Chemische Fabrik Stockhausen GmbH, Krefeld, Fed. Rep. of Germany

[21] Appl. No.: 701,297

[22] Filed: May 13, 1991

Related U.S. Application Data

[63] Continuation of Ser. No. 333,374, Apr. 4, 1989, abandoned, which is a continuation of Ser. No. 72,312, Jul. 13, 1987, abandoned.

[30] Foreign Application Priority Data

Jul. 23, 1986 [DE] Fed. Rep. of Germany ........ 3624813

[51] Int. Cl.⁵ ................... D21H 21/28; D21H 21/06
[52] U.S. Cl. .......................... 162/168.3; 162/181.1; 526/287; 526/307
[58] Field of Search ...................................... 162/168.3

[56] References Cited

U.S. PATENT DOCUMENTS

| | | | |
|---|---|---|---|
| 3,043,822 | 7/1962 | Maeder | 162/168.3 |
| 3,658,772 | 4/1972 | Volk | 526/307.6 |
| 4,301,266 | 11/1981 | Muenster | 526/212 |
| 4,361,687 | 11/1982 | Arndt | 524/850 |
| 4,509,987 | 4/1985 | Farrar | 524/425 |

FOREIGN PATENT DOCUMENTS

| | | |
|---|---|---|
| 0097495 | 1/1984 | European Pat. Off. . |
| 3047688 | 7/1982 | Fed. Rep. of Germany . |
| 3123732 | 12/1982 | Fed. Rep. of Germany . |
| 3624813 | 3/1988 | Fed. Rep. of Germany . |
| 1540020 | 10/1967 | France . |
| 106268 | 6/1974 | German Democratic Rep. . |
| 479636 | 11/1965 | Switzerland . |

*Primary Examiner*—Christopher Henderson
*Attorney, Agent, or Firm*—Sprung Horn Krammer & Woods

[57] ABSTRACT

The present invention relates to amphoteric water soluble polymers which contain
a) 90 to 30%-wt acrylic acid and/or methacrylic acid
b) 10 to 60%-wt of a compound of the formula

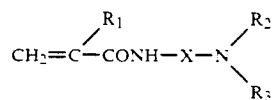

wherein $R_1$ stands for hydrogen or the methyl radical, $R_2$ and $R_3$, which are the same or different, stand for the methyl or ethyl radical, and an optionally branched alkaline radical with 1 to 5 C atoms stands for X and optionally, up to 50%-wt of acrylamidomethylpropane sulfonic acid and up to 10%-wt of a further ethylenically unsaturated compound, the molecular weight of these polymers, measured at a pH value of 8.0, being smaller than 100,000. The present invention also relates to the process for producing these polymers, and their use as grinding or dispersing agents for the production of highly concentrated aqueous pigment suspensions.

5 Claims, No Drawings

MANUFACTURING PAPER EMPLOYING A POLYMER OF ACRYLIC OR METHACRYLIC ACID

This is a continuation of application Ser. No. 333,374 filed Apr. 4, 1989, now abandoned, which is a continuation of Application Ser. No. 72,312, filed Jul. 13, 1987, now abandoned.

The present invention relates to amphoteric water soluble polymers, a process for the production of said polymers, as well as the use of said polymers as dispersing agents.

Fillers used in the paper industry as well as in some other areas of industry such as, for example, the paint and dyestuff industries are available not only in powder form, but also in the form of aqueous dispersions. Various economic grounds, such as the elimination of drying, as well as the potential for a more rational work cycle in the production of paper, favour the use of fillers in the form of dispersions. Furthermore, the use of such dispersions eliminates the problem of dust in the workplace, such as has been experienced heretofore.

The production of filler suspensions is known. Usually, low molecular water soluble polymers that contain a high proportion of anionically effective groups, e.g., carboxyl groups, are used as dispersing agents. In many instances, commercial products are homopolymers of acrylic acid in the form of their sodium or ammonium salts.

DE-OS 31 23 732 describes a process in which copolymers of acrylic acid and acrylamidomethyl propane sulfonic acid are used as dispersing agents. This results in highly concentrated aqueous pigment suspensions, the viscosity of which decreases only slightly as temperature increases. Such behaviour is especially favourable for the grinding process.

EP 0 035 640 describes the use of oxalkylated aliphatic ammonium salts as dispersing agent. Filler suspensions produced with this are characterized by the extremely high concentrations of solids that can be achieved, which can exceed 75%.

DE-OS 32 30 737 describes the use of a combination of an anionic polymer with a cationic polymer for dispersing calcined clay. It is preferred that a cross-linked acrylic emulsion copolymer that contains an acid be used as the anionic polymer and a quaternary polyamine be used as the cationic polymer. The use of such a combination of dispersing agents results in a reduced sedimentation of kaolin in the storage tank as well as a reduction of dilatancy that is usually very marked in the case of kaolin.

In EP 0 129 329 water soluble copolymers are used for the production of pigment dispersions that contain carboxyl and sulfonic acid groups, wherein the molecular weight is between 1000 and 5000 and the polydispersity of the copolymer is smaller than 1.5. Improved dispersing characteristics are achieved by the low polydispersity. Calcium carbonate suspensions with a proportion of at least 87% particle size of less than 2 μm are claimed in EP 0 108 842. Copolymers of acrylic acid and acrylamidomethyl propane sulfonic acid with molecular weights between 1000 and 2000 are used as dispersing agents. The dispersions according to the present invention are distinguished by improved flow stability.

With all their advantages, filler suspensions that are produced conventionally, i.e., by the addition of anionic dispersing agent, display a very serious disadvantage. Ordinarily, in the production of paper, retention agents are used to accelerate the removal of water and to retain the fibre material and filler. For the most part, these retention agents are cationically modified polyelectrolytes. The cationic groups of these retention agents react with the polymer bound anionic groups during neutralization, i.e., a quantity that is equivalent to the number of the anionic groups is bonded to cationic groups and the number of cationic groups required for the retention effect is reduced thereby.

This effect occurs if a filler suspension produced with anionic dispersing agents is used in the paper pulp. A satisfactory retention effect can then be achieved only by a drastic increase in the quantity of retention agent that is added. It was the task of the present invention to describe a dispersing agent for the production of filler suspensions that does not display this effect, which is prejudicial to retention. This task has been solved by amphoteric water soluble polymers that are copolymers and have the following incorporated in them:

a) 90 to 30%-wt acrylic acid and/or methacrylic acid b) 10 to 60%-wt of a compound of the formula

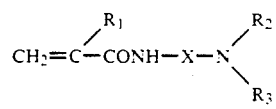

wherein $R_1$ stands for hydrogen or a methyl radical, $R_2$ and $R_3$, which are either the same or different, stand for the methyl or the ethyl radical, and an optionally branched alkylene radical with 1–5 C atoms stands for X.

c) 0 to 50%-wt of acrylamidomethyl propane sulfonic acid d) 0 to 10%-wt of another ethylenically unsaturated compound, and which have a molecular weight, measured at a pH value of 8.0, of less than 100,000.

It is preferred that the polymers according to the present invention have a molecular weight of 500 to 50,000, determined by the methods of gel permeation chromatography. N-alkyl substituted acrylamides or methacrylamides that have a tertiary amino group at the alkyl radical can be used as monomer b). Examples of these are dimethylaminopropyl acrylamide, dimethylaminopropylmethacryl amide, dimethylamino-2,2-dimethylpropyl acrylamide, dimethylamino-2,2-dimethylpropylmethacryl amide, and dimethylaminopropyl acrylamide. Acrylamide or methacrylamide that is converted after polymerisation with formaldehyde and dimethylamine to the the corresponding Mannich base can also be used as monomer b).

Acrylamide, acrylic acid methylester, hydroxypropyl acrylate, and acryl nitrile are examples of the monomer d). A modification of the properties of the copolymer is meant to be achieved by the monomers of group d).

The dispersing agents according to the present invention can be obtained by polymerisation methods known per se.

Preferred is polymerisation of the monomers in an aqueous solution or in mixtures of water and solvents that are miscible with water, such as alcohol, e.g., isopropanol. Initiation of the polymerisation process takes place with the help of radical polymerisation catalysts. Redox systems and/or thermally disintegrating radical initiators of the type of azo compounds such as, for example, azoisobutyric acid nitrile can be used. Combinations of hydrogen peroxide. the salts of peroxydisulfuric acid or tertiary butylhydroperoxide with sodium sulfite or sodium dithionite as reduction components are suitable for use as redox systems.

In order to achieve the molecular weight of less than 100,000 as stipulated by the present invention, it is expedient to carry out polymerisation in the presence of polymerisation regulators. These can be lower alcohols with 1-4 carbon atoms, preferably isopropanol. In addition, hydroxyl ammonium salts and mercaptans, e.g., mercaptoethanol or thioglycolic acid (mercaptoacetic acid) are effective as regulators.

Copolymerisation can be carried out in that a part of the monomer mixture is prepared, copolymerisation is initiated, the monomer mixture then being added continually. During copolymerisation, temperature can vary within a very wide range. Depending on the type of catalyst used, temperatures can optimally be between 50° C. and 200° C. It is also possible to carry out polymerisation at the boiling point of the solvent or, under pressure, at temperatures that are above this.

Very frequently, it can be advantageous to carry out polymerisation under adiabatic conditions. In this case, the start of polymerisation takes place expediently at lower temperatures, e.g., at 20° C. The final temperature that is achieved as a result of the polymerisation heat that is liberated will depend on the monomers that are used and concentration conditions, and may amount to 180° C., for example, at a corresponding pressure.

During copolymerisation, the pH value can also vary in a very wide range. It is expedient that copolymerisation be carried out at low pH values, although pH values above the neutral point are also possible.

After polymerisation, a pH value in the range of 5-12, and preferably 7-8, is adjusted by means of an aqueous base, e.g., sodium hydroxide, ammonia, or potassium hydroxide.

The copolymers are used to produce concentrated solid suspensions. The polymer can be added either directly during the grinding process or after grinding, as a dispersing agent. Chalk, kaolin, satin white, titanium dioxide, and clay are examples of pigments. The quantities of copolymers that are used, relative to the pigments, amount to 0.02 to 1.0%, and preferably 0.05 to 0.2%. The solid content of the pigment suspension can amount to 80%-wt, depending on the pigment that is used and its particle size and particle-size distribution. The pigment suspensions attained with the copolymers according to the present invention are distinguished by greatly improved storage life as compared to conventional products based on polyacrylates.

It is preferred that the pigment suspensions be used during the production of paper. As a rule, the aqueous pigment suspensions are metered into the paper thickener. After thinning to approximately 0.5%, retention agent is added to the paper pulp and passes to the wire section of the paper making machinery through the head box. When pigment suspensions that have been produced with the new type dispersing agent are used, a greatly improved effectiveness of the retention agent can be seen in comparison with conventional products. This applies to both fibre-material retention as well as filler retention.

The processes in the head box and in the adjacent wire section of a paper making machine can be simulated extremely well with the so-called Britt-Jar tester; whereas, when commercially available dispersing agents are used a reduction of retention by approximately 10% can be established, retention is not degraded when the new type of products are used.

The present invention will be explained in greater detail on the basis of the following examples: parts are parts by weight.

Production of the copolymers

Copolymer 1

62 parts dimethylaminopropylacrylamide were introduced into a mixture of 675 parts water, 38 parts 37-% hydrochloric acid, and 225 parts acrylic acid during stirring and cooling. This resulted in a pH value of 1.6. The temperature was 28° C. 42 parts 35-% hydrogen peroxide, 36 parts mercaptoethanol, and 2 parts 1-% iron (II) sulfate solution were stirred into the monomer solution one after the other, and the stirrer was then stopped. Polymerisation which began immediately could be detected by means of a rise in temperature. After approximately two minutes, the final temperature reached 95° C. Next, 4.5 parts 35-% hydrogen peroxide and 2 parts 40-% hydroxylamine hydrochloride solution in water were stirred in. This was allowed to react for one hour. The pH value of 8.0 was set by the addition of 269 parts 45-% sodium hydroxide. The viscosity of the product amounted to 30 mPa.s. Determination of the molecular weight by means of gel permeation chromatography (GPG) indicated a value of 520.

Copolymer 2

During cooling, 72 parts dimethylaminopropylacrylamide were introduced into a mixture consisting of 621 parts water, 45 parts 37-% hydrochloric acid, and 263 parts acrylic acid. This resulted in a pH value of 1.6. The temperature was 20° C. Next, 3 parts 35-% hydrogen peroxide, 1 part mercaptoethanol, and 0.5 parts 1-% iron sulfate (II) solution were stirred into the monomer solution one after the other, and the stirrer was then stopped. Polymerisation, which began immediately, was indicated by a rise in temperature. After approximately 8 minutes, the end temperature of 95° C. was reached. Next, 4.5 parts 35-% hydrogen peroxide and 2 parts 40-% hydroxylamine hydrochloride solution were stirred into the water. This was allowed to react for one hour and a pH value of 8.0 was set by the addition of 309 parts 45-% sodium hydroxide. The viscosity of the product amounted to 9500 mPa.s. Molecular weight determination indicated a value of 44000.

Copolymer 3

During cooling, 115 parts of dimethylaminopropylmethacrylamide were introduced into a mixture consisting of 603 parts water, 72 parts 37-% hydrochloric acid, and 210 parts acrylic acid. This resulted in a pH value of 1.6. The temperature was 20° C. Next, 19 parts 35-% hydrogen peroxide, 5 parts mercaptoethanol, and 0.5 parts 1-% iron (II) sulfate solution were stirred into the monomer solution one after the other. Polymerisation, which began immediately, was indicated by a rise in temperature. After approximately 4 minutes, the end temperature of 95° C. was reached. Next, 4.5 parts 35-% hydrogen peroxide and 2 parts 40-% hydroxylamine hydrochloride solution in water was stirred in. This was allowed to react for one hour and a pH value of 8.0 was set by the addition of 255 parts 45-% sodium hydroxide. The viscosity of the product amounted to 180 mPa.s. Molecular weight determination indicated a value of 6300.

Copolymer 4

During cooling, 144 parts of dimethylamino-2,2-dimethyl propylacrylamide were introduced into a mixture consisting of 592 parts water, 90 parts 37-% hydrochloric acid, and 175 parts acrylic acid. This resulted in a pH value of 1.6. The temperature amounted to 20° C. Next, 28 parts 35-% hydrogen peroxide, 24 parts mercaptoethanol, and 1 part 1-% iron (II) sulfate solution were stirred into the monomer solution and the stirrer then stopped. Polymerisation, which began immediately, was indicated by a rise in temperature. After approximately 2 minutes, an end temperature of 95° C. was reached. Next, 4.5 parts 35-% hydrogen peroxide and 2 parts 40-% hydroxylamine hydrochloride solution in water were introduced. This was allowed to react for one hour and a pH value of 8.0 was set by the addition of 216 parts 45-% sodium hydroxide. The viscosity of the product amounted to 39 mPa.s. Determination of the molecular weight indicated a value of 1800.

Copolymer 5

During cooling, 173 parts of dimethylamino-2,2-dimethyl propylmethacrylamide were introduced into a mixture consisting of 580 parts water, 107 parts 37-% hydrochloric acid, and 140 parts acrylic acid. This resulted in a pH value of 1.6. The temperature amounted to 20° C. Next, 28 parts 35-% hydrogen peroxide, 24 parts mercaptoethanol, and 1 part 1-% iron (II) sulfate solution were stirred into the monomer solution one after the other and the stirrer then stopped. Polymerisation, which began immediately, was indicated by a temperature increase. After approximately 2 minutes, an end temperature of 95° C. was reached. Next, 4.5 parts 35-% hydrogen peroxide and 2 parts 40-% hydroxylamine hydrochloride solution in water were stirred in. This was allowed to react for one hour and a pH value of 8.0 was set by the addition of 174 parts 45-% sodium hydroxide. The viscosity of the product amounted to 88 mPa.s. Determination of the molecular weight indicated a value of 4700.

Copolymer 6

During cooling, 72 parts of dimethylaminopropylacrylamide were introduced into a mixture consisting of 621 parts water, 45 parts 37-% hydrochloric acid, 125 parts acrylic acid, 50 parts methacrylic acid, and 200 parts acrylaminomethylpropane sulfonic acid. This resulted in a pH value of 1.6. The temperature amounted to 20° C. Next, 28 parts 35-% hydrogen peroxide, 24 parts mercaptoethanol, and 1 part 1-% iron (II) sulfate solution were stirred one after the other into the monomer solution and the stirrer then stopped. Polymerisation, which began immediately, was indicated by a temperature increase. After approximately 2 minutes, an end temperature of 95° C. was reached. Next, 4.5 parts 35-% hydrogen peroxide and 2 parts 40-% hydroxylamine hydrochloride solution in water were stirred in. This was allowed to react for one hour and a pH value of 8.0 was set by the addition of 309 parts 45-% sodium hydroxide. The viscosity of the product amounted to 55 mPa.s. Determination of the molecular weight indicated a value of 2900.

Copolymer 7

64 parts water, 10 parts acrylic acid, 10 parts 38% aqueous acrylamide solution and 12 parts 35-% hydrogen peroxide were prepared in a reaction flask and heated to 90° C. A second mixture consisting of 155 parts 38-% aqueous acrylamide solution and 177 parts of acrylic acid was produced in a second vessel and this second solution was then introduced into the second solution containing the hydrogen peroxide whilst stirring within a period of one hour. 54 parts of hydrogen peroxide (35-%) and 12 g of hydroxylaminhydrochloride (40-% in water) were then dosed in through additional inlets, proportionally to the monomer mixture. The temperature was maintained at a steady 90° C. Once this addition had been ended, 4.5 parts of hydrogen peroxide (35-%) and 2 parts of hydroxylaminhydrochloride solution (40-% in water) were sprayed in. This was allowed to react for one hour and a pH value of 8.0 was set by the addition of 229 parts 45-% sodium hydroxide. After cooling to 20° C., and whilst stirring, 99 parts 40-% dimethylaminhydrochloride and 71.5 parts 37-% formalin were added. This was allowed to react for 15 hours. The viscosity of the product amounted to 38 mPa.s. Determination of the molecular weight indicated a value of 1750.

Copolymer 8

In a manner similar to that used for copolymer 7, 546 parts water and 329 parts 38-% acrylamide solution and 125 parts of acrylic acid were converted. The neutralization took place with 153 parts 45-% sodium hydroxide and 198 parts 40-% dimethylamine and 143 parts 37-% formalin were used for the subsequent conversion to the Mannich base. The viscosity of the product amounted to 32 mPa.s. Determination of the molecular weight indicated a value of 1360.

Production of the pigment dispersions

General instruction

The quantities of dispersing agent shown in the table (in each instance 100-% polymer) were added to 145 g of water in a 400 ml beaker and the pH value was set to 10.0. Whilst stirring with a high-speed laboratory stirrer fitted with a 30-mm dissolve disk (4000 rpm), 355 g of finely ground chalk (particle size 90% smaller than 2 μm) were sprinkled in in small increments. Once the total quantity of the pigment had been introduced, it was stirred for an additional 15 minutes at a speed of 5000 rpm. Subsequently, the viscosity of the pigment dispersion was determined. The dry-substance content amounted to 71%.

| Suspension No. | Dispersing Agent Example No. | Addition in % relative to pigment | Viscosity mPa.s | pH Value |
| --- | --- | --- | --- | --- |
| 1 | 1 | 0.1 | 90 | 9.72 |
| 2 | 1 | 0.05 | 136 | 9.77 |
| 3 | 2 | 0.15 | 230 | 9.89 |
| 4 | 3 | 0.1 | 245 | 9.75 |
| 5 | 4 | 0.15 | 290 | 9.39 |
| 6 | 5 | 0.2 | 340 | 9.57 |
| 7 | 6 | 0.1 | 86.5 | 9.63 |
| 8 | 6 | 0.05 | 148 | 9.71 |
| 9 | 7 | 0.1 | 80 | 9.76 |
| 10 | 7 | 0.05 | 99 | 9.87 |
| 11 | 8 | 0.1 | 79 | 9.81 |
| 12 | 8 | 0.1 | 260 | 9.75 |
| 13 | Comparison | 0.1 | 85 | 9.82 |

Retention tests

Retention tests were carried out using the above described dispersing agents and the pigments or filler dispersions produced therefrom, this being done according to the recognized Britt-Jar dynamic drainage/retention test that has been described in the literature ("New methods for monitoring retention", K. W. Britt, J. E. Unbehend Tappi, February 1976, Vo. 59, No. 2, pgs. 67–70).

A standard substance composition made up as follows was used for the retention tests:
- the fibre material consisted of up to 70% long fibre cellulose and up to 30% of a short fibre cellulose. 20% filler, in this case chalk, of the quality of Omya DX 1 was added to the fibre; the chalk was pretreated either
- without dispersing agent;
- with a commercially available anionic dispersing agent (in this instance, Polystabil S 312: homopolymer of sodium acrylate, molecular weight S 312);
- or with a new type dispersing agent.

With chalk used as a filler, the pH value of the paper pulp was adjusted to approximately 7 to 7.5 (neutral working). The retention on the test substance (fibre substance including filler, 80:20%-wt) was checked both without the addition of a retention agent as well as (and this was predominantly the case) with the addition of a known cationic polymer retention agent Praestol P 411 K: (copolymer of acrylamide and an acrylamide acrylic acid ester, cationic amount 25%-wt): it was intended to establish any possible reciprocal action between the products used as dispersing agent and the cationic retention agents that were used.

The conduct of the Britt-Jar test method and the retention established therefrom, is taken to be state of the art. Tests were carried out at a stirrer speed of 600 rpm. The value indicated as "retention" indicates what percentage of the mass of the substance used was trapped by the screen, i.e., how high the amount of material mass remaining on the sieve is for sheet forming (in percentage by weight).

The higher this value, the better the retention, i.e., the more mass of the substance that is used is actually converted to paper sheet.

It is understandable that in the event of incompatibility between the dispersing agent that is used and the retention agent that is used, its retaining effect will be diminished: the proportion of the mass of the paper pulp that is retained is smaller, and considerable proportions of the mass of the pulp escape with the water that drains off and this "impoverishes" the sheet-forming process. It was shown during retention tests that with the normally used anionic dispersing agent used in the addition concentrations of 0.1 to 0.2% normally used to adjust a stable dispersion state of the suspending agent there is a clearly negative effect on the action of the cationic retention agent, in comparison to the use of the non-dispersed Omya DX 1 chalk. According to the examples set out in table 1, when a chalk that has not been dispersed with an anionic dispersing agent is used, retention is between 59.4% and 66%, dependign on the quantities of cationic retention agent that are added. When a chalk suspending agent that has been dispersed with the anionic disperser Polystabil S 312, this results in a retention of only 53.5 or 63.2% of the mass, respectively, i.e., the values lie some 10% lower. Here, there is a clear interaction between the anionic dispersing agent and the cationic retention agent, this being in the sense of a clear deterioration of the retention effect compared to the use of a chalk not previously treated with dispersing agent.

Retention Tests

| Example No. | Pigment suspension from example no. | Retention % Addition 0.01%-wt | Retention Agent 0.02%-wt |
|---|---|---|---|
| 1 + 2 | 1 | 59.2 | 72.6 |
| 3 + 4 | 2 | 59.6 | 74.1 |
| 5 + 6 | 4 | 60.1 | 72.6 |
| 7 + 8 | 5 | 58.8 | 72.4 |
| 9 + 10 | 6 | 59.3 | 72.0 |
| 11 + 12 | 7 | 59.7 | 73.1 |
| 13 + 14 | 8 | 60.1 | 73.4 |
| 15 + 16 | 9 | 58.9 | 72.2 |
| 17 + 18 | 10 | 58.3 | 73.0 |
| 19 + 20 | 11 | 60.3 | 72.6 |
| 21 + 22 | 12 | 58.7 | 73.1 |
| 23 + 24 | 13 (Comparison) | 53.5 | 63.2 |
| 25 + 26 | Zero sample | 60.5 | 73.4 |

Zero sample = without dispersing agent
Comparison = dispersed with Polystabil S 312 (commercially available polyacrylic acid)

Storage tests

Behaviour during storage of a chalk suspension was assessed after 28 days (storage temperature: 20°±5° C., immobile storage), in particular
- formation of strata;
- the nature ("stirability") of the bottom or suspension, respectively, in the event of there being no bottom, by grades (see table)

TABLE

Grading of Stirability

| Grade | Criteria |
|---|---|
| 1 | unchanged suspension |
| 2 | loose, easily stirred with a glass rod (length: 20 cm, diameter: 7 mm, rounded end); when the glass rod was inserted and withdrawn the bottom or the suspension closed up once again |
| 3 | stirrable with a glass rod; when the glass rod was inserted and then withdrawn the base or suspension, respectively, does not run together again |
| 4 | still stirrable with the glass rod, compact |
| 5 | no longer stirrable with the glass rod, compact; still stirrable with a laboratory dissolver (at 5.00 min$^{-1}$) |
| 6 | hard ("stone-like") cannot be stirred either with the glass rod or with the oratory dissolver |

- the viscosity and the pH value of the dispersion after stirring with the laboratory dissolver The chalk suspensions produced with the dispersing agents according to the present invention displayed only a slight tendency to form strata, a good "stirability" (grade: 2) and proved to be pH stable. The viscosity remained unchanged to a very great extent.

Assessment after 28 Days

| Suspension No. | Stratification in % | Stirability (Grade) | Viscosity mPa.s | pH Value |
|---|---|---|---|---|
| 1 | 8 | 2 | 93 | 9.75 |
| 2 | 6 | 2 | 131 | 9.75 |
| 3 | 5 | 2 | 225 | 9.93 |
| 4 | 9 | 2 | 248 | 9.82 |
| 5 | 5 | 2 | 295 | 9.47 |
| 6 | 7 | 2 | 325 | 9.48 |
| 7 | 8 | 2 | 82 | 9.68 |

| Suspension No. | Assessment after 28 Days | | | pH Value |
|---|---|---|---|---|
| | Stratification in % | Stirability (Grade) | Viscosity mPa.s | |
| 8 | 6 | 2 | 143 | 9.79 |
| 9 | 5 | 2 | 86 | 9.83 |
| 10 | 7 | 2 | 104 | 9.87 |
| 11 | 4 | 2 | 78 | 9.77 |
| 12 | 6 | 2 | 242 | 9.63 |
| 13 Comparison | 16 | 5 | 87 | 9.87 |

We claim:

1. In the manufacture of paper wherein the paper-forming material is contacted with an aqueous slurry containing a retention agent and a pigment or filler, and then the slurry is de-watered to form paper, the improvement wherein the aqueous slurry comprises a highly concentrated aqueous suspension of a pigment or filler produced by grinding such pigment or filler in the presence of water and an additive comprising an amphoteric water soluble polymer which incorporates
  a) 90 to 30%-wt acrylic acid and/or methacrylic acid
  b) 10 to 60%-wt of a compound of the formula

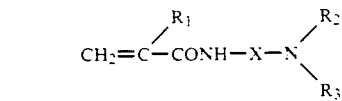

wherein $R_1$ stands for hydrogen or the methyl radical, $R_2$ and $R_3$, which are either the same or different, stand for the methyl or ethyl radical, and an alkylene radical having 1 to 5 C atoms stands for X
  c) 0 to 50%-wt of acrylamidomethylpropane sulfonic acid
  d) 0 to 10%-wt of another ethylenically unsaturated compound selected from the group consisting of acrylamide, acrylic acid methylester, hydroxypropyl acrylate, and acrylonitrile and the molecular weight, measured at a pH value of 8.0, is smaller than 100,000.

2. A process according to claim 1, wherein the pigment or filler comprises calcium carbonate.

3. A process according to claim 1, wherein the pigment or filler comprises kaolin.

4. A process according to claim 1, wherein the resulting aqueous suspension is alkaline.

5. A process according to claim 1, wherein the resulting aqueous suspension is alkaline.

* * * * *